United States Patent
Guo et al.

(10) Patent No.: US 9,875,846 B2
(45) Date of Patent: Jan. 23, 2018

(54) HEATED CAPACITOR AND METHOD OF FORMING THE HEATED CAPACITOR

(71) Applicant: Texas Instruments Incorporated, Dallas, TX (US)

(72) Inventors: Honglin Guo, Dallas, TX (US); Byron Lovell Williams, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/042,319

(22) Filed: Feb. 12, 2016

(65) Prior Publication Data

US 2016/0163452 A1 Jun. 9, 2016

Related U.S. Application Data

(62) Division of application No. 14/288,433, filed on May 28, 2014, now Pat. No. 9,293,254.

(51) Int. Cl.
| | |
|---|---|
| *H01G 2/00* | (2006.01) |
| *H01G 2/08* | (2006.01) |
| *H01B 3/30* | (2006.01) |
| *H01G 4/18* | (2006.01) |
| *H01G 4/018* | (2006.01) |

(52) U.S. Cl.
CPC ............... *H01G 2/08* (2013.01); *H01B 3/306* (2013.01); *H01G 4/018* (2013.01); *H01G 4/18* (2013.01); *Y10T 29/42* (2015.01)

(58) Field of Classification Search
CPC ........ H01L 28/40; H01B 3/306; H01G 4/018; H01G 4/18; H01G 2/08; Y10T 29/422

USPC ............................. 257/68; 361/272; 29/25.42
See application file for complete search history.

(56) References Cited

U.S. PATENT DOCUMENTS

| | | | |
|---|---|---|---|
| 2007/0057343 A1 | 3/2007 | Chinthakindi | |
| 2008/0278887 A1* | 11/2008 | Zelner | H01G 4/1227 361/313 |
| 2009/0125056 A1 | 5/2009 | Buchbinder | |
| 2012/0281335 A1 | 11/2012 | Engel | |
| 2013/0062733 A1* | 3/2013 | Summerfelt | H01L 27/11507 257/532 |
| 2014/0084416 A1* | 3/2014 | Kang | H01L 23/50 257/532 |
| 2014/0090881 A1* | 4/2014 | Shin | H05K 1/185 174/260 |

FOREIGN PATENT DOCUMENTS

WO 2009136320 A1 11/2009

OTHER PUBLICATIONS

European Search Report, PCT/US2015032993, Applicant "Texas Instruments Incorporated", dated Oct. 26, 2017.

* cited by examiner

*Primary Examiner* — Vongsavanh Sengdara
(74) *Attorney, Agent, or Firm* — Jacqueline J. Garner; Charles A. Brill; Frank D. Cimino

(57) ABSTRACT

A heated capacitor runs current through either a lower metal plate, an upper metal plate, a lower metal trace that lies adjacent to a lower metal plate, an upper metal trace that lies adjacent to an upper metal plate, or both a lower metal trace that lies adjacent to a lower metal plate and an upper metal trace that lies adjacent to an upper metal plate to generate heat from the resistance to remove moisture from a moisture-sensitive insulating layer.

14 Claims, 13 Drawing Sheets

HEATED CAPACITOR AND METHOD OF FORMING THE HEATED CAPACITOR

CROSS REFERENCE TO RELATED APPLICATIONS

This application is a divisional of U.S. Nonprovisional patent application Ser. No. 14/288,433, filed May 28, 2014, the contents of which are herein incorporated by reference in its entirety.

BACKGROUND OF THE INVENTION

1. Field of the Invention

The present invention relates to a capacitor and, more particularly, to a heated capacitor and a method of forming the heated capacitor.

2. Description of the Related Art

A capacitor is a well-known electronics device that stores an electric charge. Capacitors have lower and upper conducting plates which are separated by an insulating material. A capacitor can be formed on a semiconductor die as a stand-alone structure, or as part of an integrated circuit.

One common use of capacitors is to protect other electronic circuits from an electric surge that results from an external event. For example, the lower plate of a capacitor can be connected to ground, while the upper plate of the capacitor can be connected to an antenna and an RF front end so that the capacitor protects the RF front end and associated circuitry from a lighting strike to the antenna.

One problem with capacitors that are used to provide protection from an electric surge that is some insulating materials are sensitive to humidity, which can significantly degrade the performance of the capacitor. For example, all polymers, such as polyimide, are sensitive to moisture, which can reduce the performance of a capacitor from 5,000V to only 2,000V. Thus, there is a need for an approach to eliminating moisture problems.

SUMMARY OF THE INVENTION

The present invention provides a heated capacitor that removes moisture from a moisture-sensitive insulating layer. A heated capacitor of the present invention includes a first pad, a second pad, a non-conductive layer, and a first metal structure that touches the non-conductive layer. The heated capacitor also includes a second metal structure that touches the non-conductive layer. The second metal structure is connected to the first pad to receive a first voltage and to a second pad to receive a second voltage. The first voltage and the second voltage are different. The difference between the first voltage and the second voltage is to cause a current to flow into, through, and out of the second metal structure. The current is to generate heat from a resistance of the second metal structure. The heat is to remove moisture from the non-conductive layer.

The present invention also provides a method of forming a heated capacitor. The method includes forming a first metal structure, and forming a non-conductive layer that touches the first metal structure. The method also includes forming a second metal structure that touches the non-conductive layer, and connecting the first metal structure to receive a first voltage and a second voltage. The first voltage and the second voltage are different. The difference between the first voltage and the second voltage is to cause a current to flow into, through, and out of the first metal structure. The current is to generate heat from a resistance of the first metal structure. The heat is to remove moisture from the non-conductive layer.

The present invention further provides an alternate method of forming a heated capacitor. The method includes forming a first metal structure, and forming a non-conductive layer that touches the first metal structure. The method also includes forming a second metal structure that touches the non-conductive layer, and connecting the second metal structure to receive a first voltage and a second voltage. The first voltage and the second voltage are different. The difference between the first voltage and the second voltage is to cause a current to flow into, through, and out of the second metal structure. The current is to generate heat from a resistance of the second metal structure. The heat is to remove moisture from the non-conductive layer.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

FIGS. 2A-8A are plan views. FIGS. 2B-8B are cross-sectional views taken along lines 2B-2B through 8B-8B of FIGS. 2A-8A, respectively.

FIG. 10A is a plan view. FIG. 10B is a cross-sectional view taken along lines 10B-10B of FIG. 10A. FIG. 10C is a cross-sectional view taken along lines 10C-10C of FIG. 10A. FIG. 10D is a plan view taken along lines 10D-10D of FIG. 10B. FIG. 10E is a plan view taken along lines 10E-10E of FIG. 10B.

FIG. 11A is a plan view. FIG. 11B is a cross-sectional view taken along lines 11B-11B of FIG. 11A. FIG. 11C is a cross-sectional view taken along lines 11C-11C of FIG. 11A. FIG. 11D is a plan view taken along lines 11D-11D of FIG. 11B. FIG. 11E is a plan view taken along lines 11E-11E of FIG. 11B.

FIG. 12A is a plan view. FIG. 12B is a cross-sectional view taken along lines 12B-12B of FIG. 12A. FIG. 12C is a cross-sectional view taken along lines 12C-12C of FIG. 12A. FIG. 12D is a plan view taken along lines 12D-12D of FIG. 12B. FIG. 12E is a plan view taken along lines 12E-12E of FIG. 12B.

DETAILED DESCRIPTION OF THE INVENTION

Figure 1:
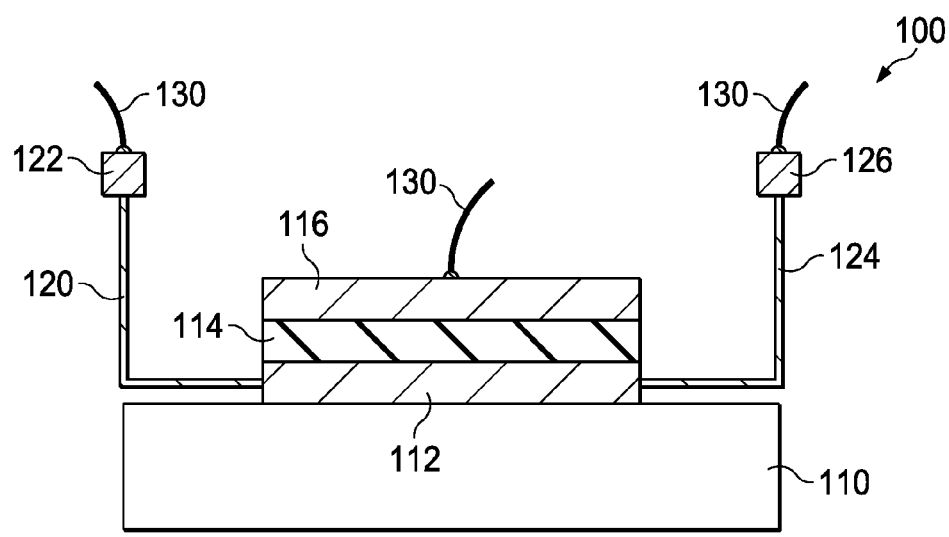
FIG. 1 is a cross-sectional view illustrating an example of a heated capacitor 100 in accordance with the present invention.

FIG. 1 shows a cross-sectional view that illustrates an example of a heated capacitor 100 in accordance with the present invention. As described in greater detail below, one of the plates of capacitor 100 is utilized as an internal heater to remove moisture from an insulating material that is sensitive to moisture.

As shown in FIG. 1, heated capacitor 100 includes a non-conductive structure 110 and a lower metal plate 112 that touches and lies over non-conductive structure 110. Non-conductive structure 110 can be implemented with a number of materials, such as silicon dioxide or a polymer like polyimide. Lower metal plate 112 can also be implemented with a number of materials, such as copper or aluminum.

As further shown in FIG. 1, heated capacitor 100 additionally includes a moisture-sensitive insulating layer 114 that touches and lies over lower metal plate 112, and an upper metal plate 116 that touches and lies over moisture-sensitive insulating layer 114. Upper metal plate 116 also lies directly over lower metal plate 112. Moisture-sensitive insulating layer 114 can be implemented with, for example, a polymer like polyimide. Upper metal plate 116 can be implemented with, for example, copper or aluminum.

In addition, heated capacitor 100 includes a metal via/trace 120 that is connected to a first side of lower metal plate 112, and a pad 122 that is connected to metal via/trace 120. Heated capacitor 100 further includes a metal via/trace 124 that is connected to a second side of lower metal plate 112, and a pad 126 that is connected to metal via/trace 124.

Heated capacitor 100 also includes a number of connecting structures 130 that are connected to upper metal plate 116 and the pads 122 and 126. In the present example, the connecting structures 130 are illustrated as wires that are bonded to upper metal plate 116 and the pads 122 and 126. Alternately, the connecting structures 130 can be implemented with solder bumps.

The pads 122 and 126 are electrically connected to external voltage sources by way of the connecting structures 130. Pad 122 is connected to receive a substantially constant voltage, such as 2V, while pad 126 is connected to receive a lower substantially constant voltage, such as ground. Upper metal plate 116, in turn, is electrically connected to a potential surge source, such as an antenna, and an internal circuit, such as an RF front end, by way of a connecting structure 130.

In operation, when a semiconductor chip that includes heated capacitor 100 is powered up, the difference between the voltages on the pads 122 and 126 causes a current to flow from pad 122 into, through, and out of lower metal plate 112 to pad 126. Lower metal plate 112, in turn, is sized so that the resistance of lower metal plate 112 to the current flow generates heat that removes moisture from moisture-sensitive insulating layer 114. In the event of an electrical surge, lower plate 112, moisture-sensitive insulating layer 114, and upper plate 116, which form a capacitor, function in a conventional manner.

Thus, one of the advantages of heated capacitor 100 is that by removing moisture from moisture-sensitive insulating layer 114, heated capacitor 100 is able to provide increased protection from an electric surge. Another advantage of heated capacitor 100 is that removing moisture from moisture-sensitive insulating layer 114 can significantly increase the lifetime of the capacitor, by up to 1000×. A further advantage of the present invention is that heated capacitor 100 can be formed without requiring the use of any additional masking steps.

FIGS. 2A-2B through 8A-8B show a series of views that illustrate a method 200 of forming a heated capacitor in accordance with the present invention. FIGS. 2A-8A show plan views. FIGS. 2B-8B show cross-sectional views taken along lines 2B-2B through 8B-8B of FIGS. 2A-8A, respectively.

Figure 2A:
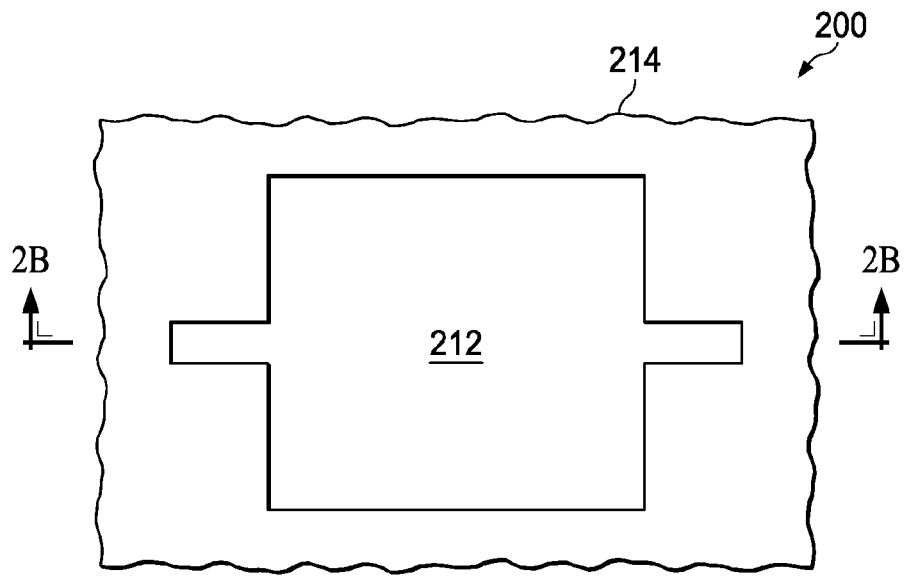
FIGS. 2A-2B through 8A-8B are a series of views illustrating a method 200 of forming a heated capacitor in accordance with the present invention.
Figure 2B:
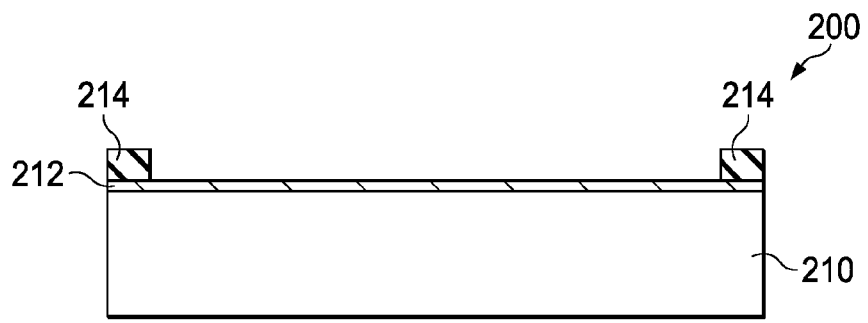

As shown in FIGS. 2A-2B, method 200 utilizes a conventionally-formed non-conductive structure 210, and begins by forming a seed layer 212 on non-conductive structure 210 in a conventional manner. Seed layer 212 can be implemented with a layer of titanium (e.g., 300 Å thick) and an overlying layer of copper (e.g., 3000 Å thick). Next, a mold 214 is formed and patterned on seed layer 212 in a conventional fashion.

Figure 3A:
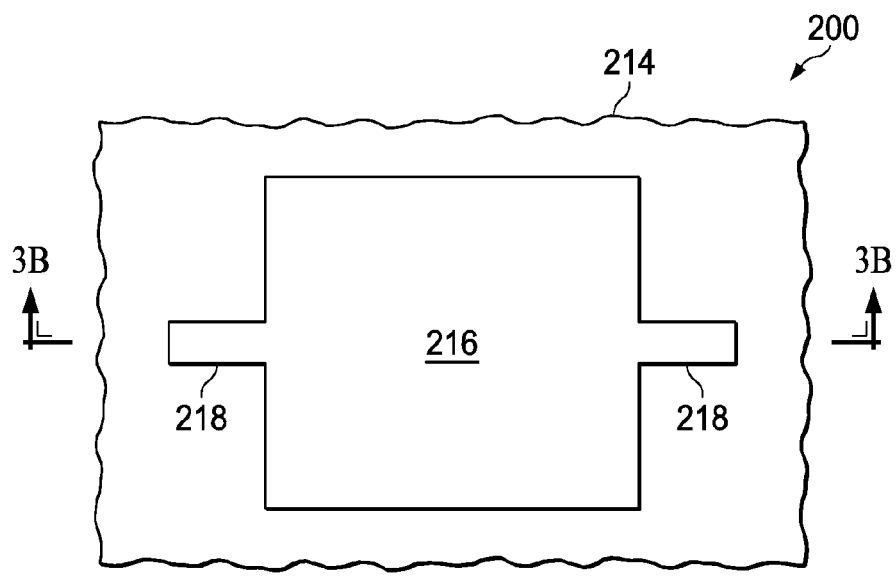
Figure 3B:
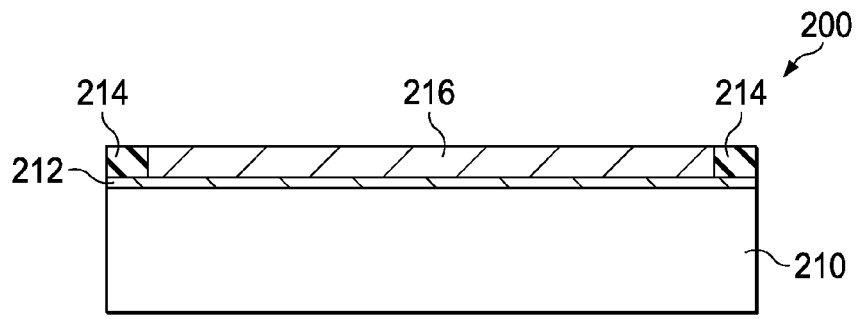

As shown in FIGS. 3A-3B, following the formation and patterning of mold 214, copper is electroplated in a conventional manner to form a lower metal plate 216 that touches and lies over non-conductive structure 210. After lower metal plate 216 has been formed, mold 214 is removed, followed by the removal of the underlying regions of seed layer 212.

In the present example, lower metal plate 216 is illustrated as a square/rectangular shape with two tabs 218 for making via connections. Alternately, other shapes, such as a circular shape, can be used. In addition, whichever shape is utilized, the shape can have no tabs or any number of tabs.

Figure 4A:
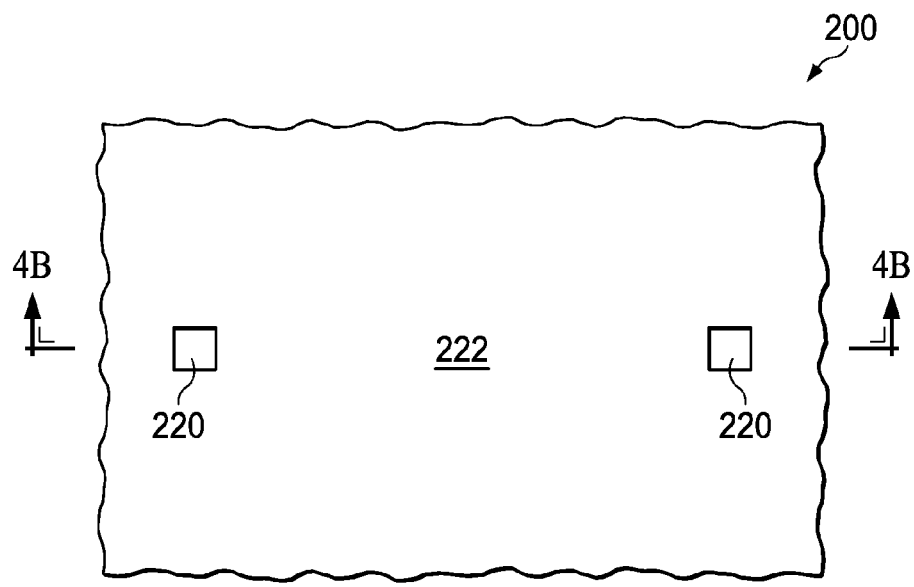
Figure 4B:
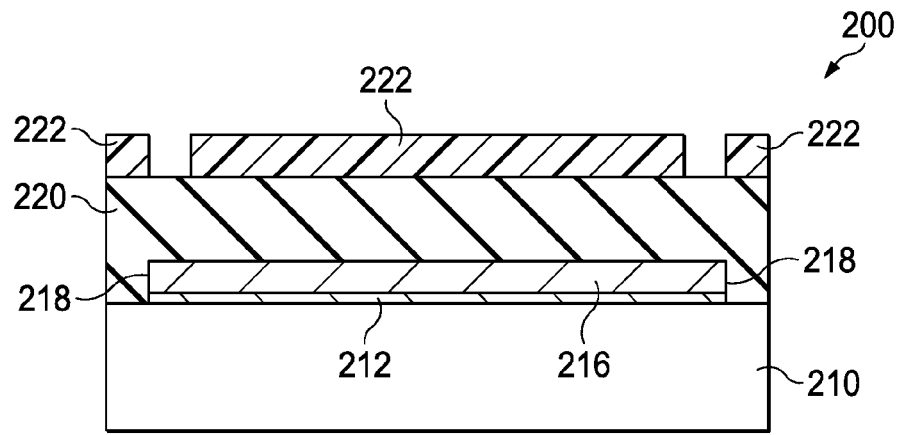

Following this, as shown in FIGS. 4A-4B, a moisture-sensitive insulating layer 220 is deposited on non-conductive structure 210 and lower metal plate 216 in a conventional manner. Moisture-sensitive insulating layer 220 can be implemented with, for example, a polymer such as polyimide.

After moisture-sensitive insulating layer 220 has been formed, a patterned photoresist layer 222 is formed on moisture-sensitive insulating layer 220. Patterned photoresist layer 222 is formed in a conventional manner, which includes depositing a layer of photoresist, projecting a light through a patterned black/clear glass plate known as a mask to form a patterned image on the layer of photoresist that softens the photoresist regions exposed by the light, and removing the softened photoresist regions.

Figure 5A:
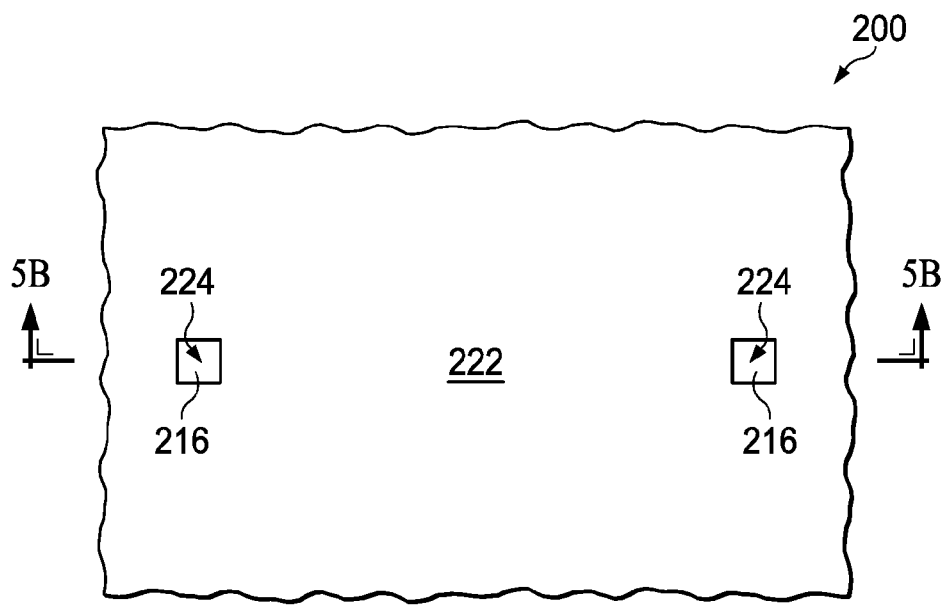
Figure 5B:
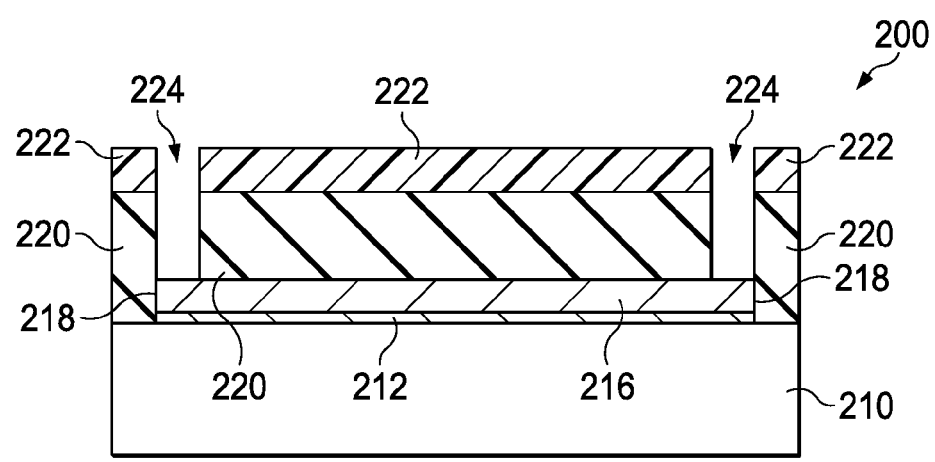

As shown in FIGS. 5A-5B, after patterned photoresist layer 222 has been formed, the exposed regions of moisture-sensitive insulting layer 220 are etched in a conventional fashion to form openings 224 that expose the top surfaces of the tabs 218 of lower metal plate 216. (When the tabs 218 are omitted, the openings 224 expose the top surface of lower metal plate 216.) Patterned photoresist layer 222 is then removed in a conventional way, such as with an ash process.

Figure 6A:
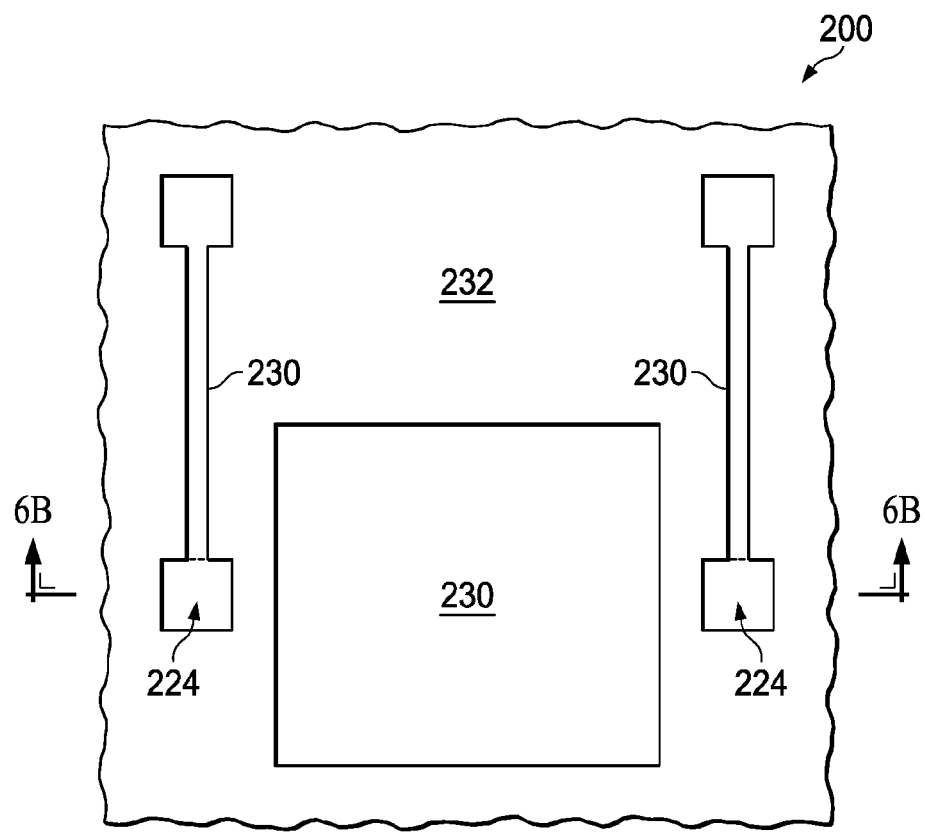
Figure 6B:
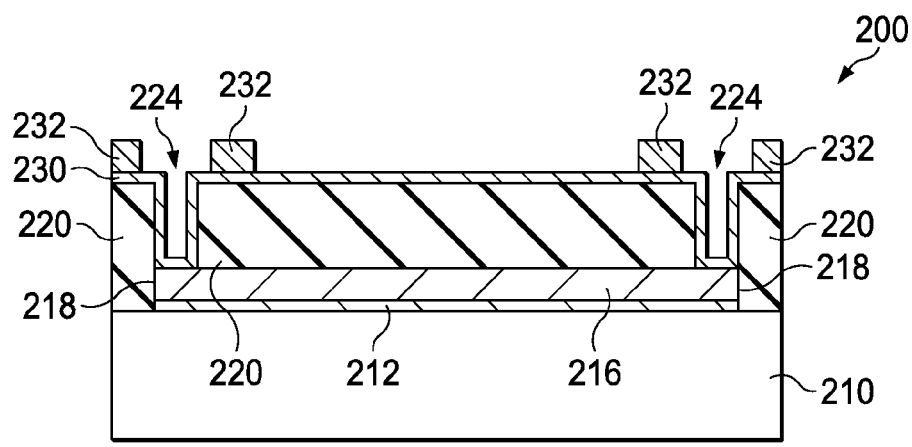

As shown in FIGS. 6A-6B, after patterned photoresist layer 222 has been removed, a seed layer 230 is formed on moisture-sensitive insulating layer 220 to line the openings 224 and touch the tabs 218 of lower metal plate 216. Seed layer 230 can be implemented with a layer of titanium (e.g., 300 Å thick) and an overlying layer of copper (e.g., 3000 Å thick). Next, a mold 232 is formed and patterned on seed layer 230.

Figure 7A:
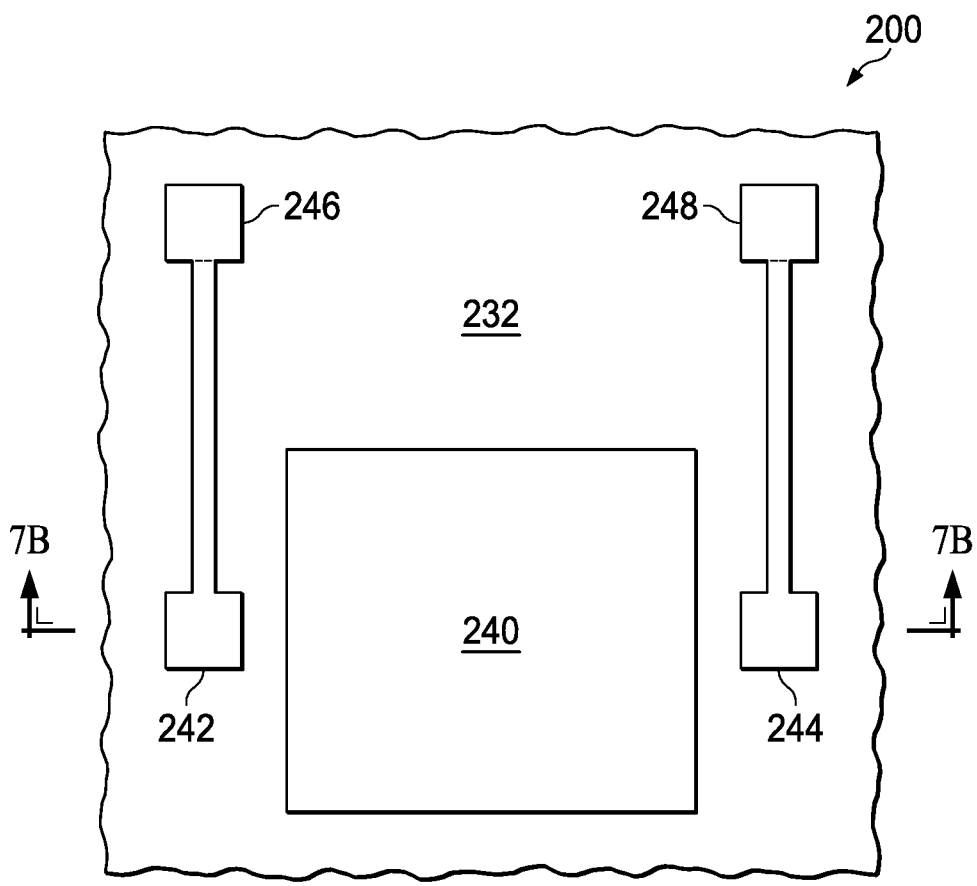
Figure 7B:
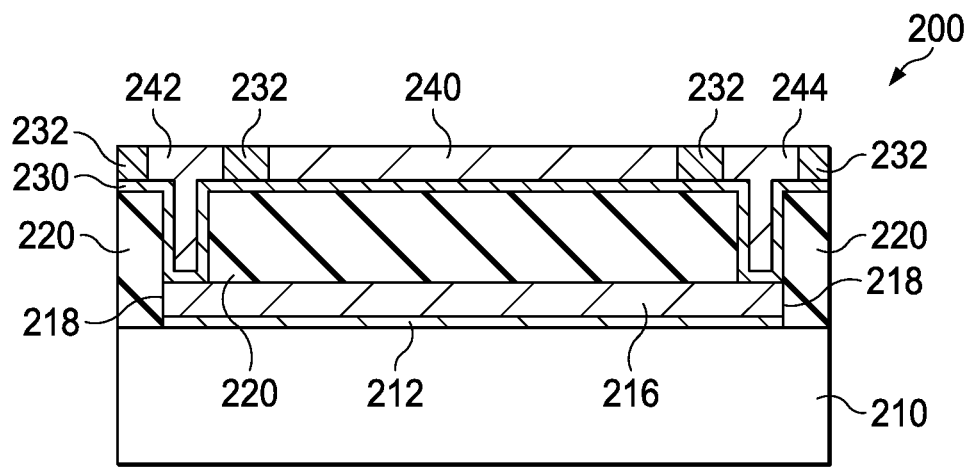

As shown in FIGS. 7A-7B, following the formation and patterning of mold 232, copper is electroplated in a conventional fashion to form an upper metal plate 240 that lies directly above lower metal plate 216. In the present example, upper metal plate 240 is illustrated as a square/rectangular shape. Alternately, other shapes, such as a circular shape, can be used.

The electroplating also forms a first via/trace 242 and a second via/trace 244 that are electrically connected to the tabs 218 of lower metal plate 216. The electroplating further forms a first pad 246 that is connected to first via/trace 242, and a second pad 248 that is connected to second via/trace 244.

Figure 8A:
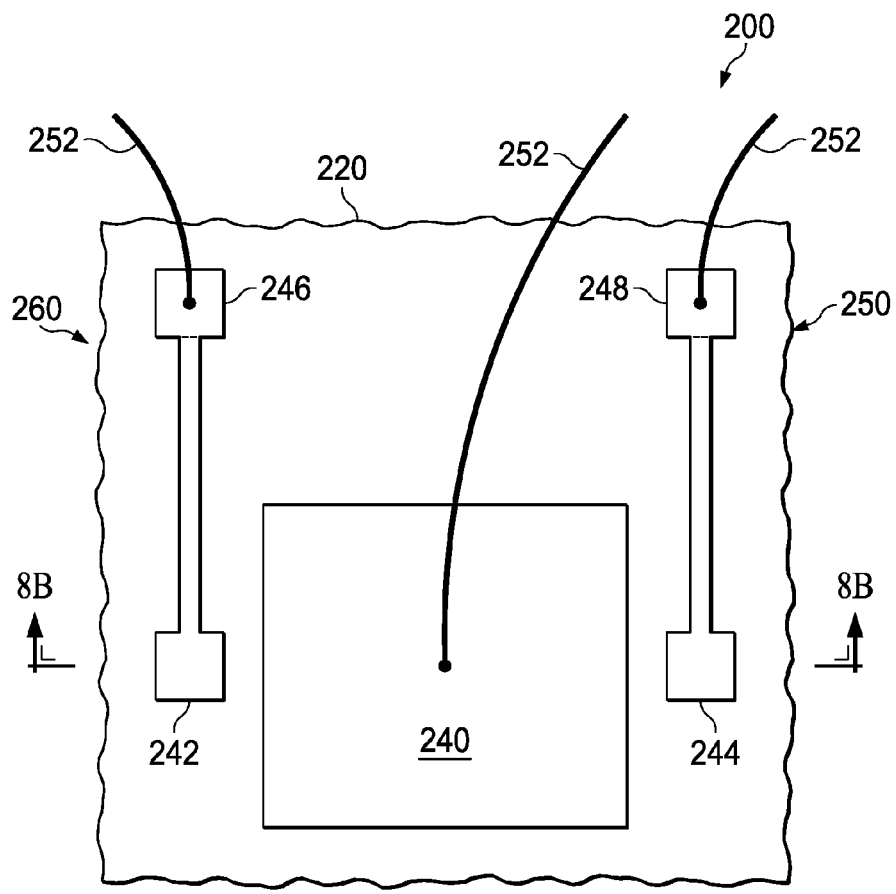
Figure 8B:
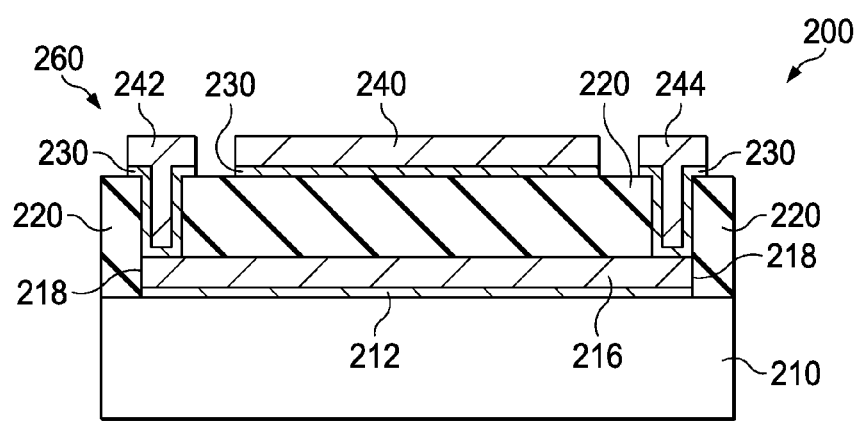

As shown in FIGS. 8A-8B, after upper metal plate 240, first via/trace 242, second via/trace 244, first pad 246, and second pad 248 have been formed, mold 232 is removed, followed by the removal of the underlying regions of seed layer 230. The removal of mold 232 and the underlying regions of seed layer 230 forms a heated capacitor structure 250.

Following this, heated capacitor structure 250 is packaged in a conventional fashion. For example, heated capacitor structure 250 can be attached to a die carrier. After heated capacitor structure 250 has been attached to the die carrier, a number of connecting structures 252 are connected to upper metal plate 240, the pads 246 and 248, and the die carrier.

In the present example, the connecting structures 252 are illustrated as wires that are bonded to upper metal plate 240, the pads 246 and 248, and the die carrier. Alternately, the connecting structures 252 can be implemented with solder bumps. (Solder bumps are not connected to the die carrier, but are connected to a printed circuit board.) Heated capacitor structure 250 with the connecting structures 252 form a heated capacitor 260.

When packaged, first pad 246 is connected to receive a substantially constant voltage, such as 2V, while second pad 248 is connected to receive a lower substantially constant voltage, such as ground. Further, upper metal plate 240 is connected to a potential surge source, such as an antenna, and an internal circuit, such as an RF front end.

Method 200 can be utilized to realize heated capacitor 100. Non-conductive structure 210 can correspond with non-conductive structure 110, lower metal plate 216 can correspond with lower metal plate 112, and moisture-sensitive insulating layer 220 can correspond with moisture-sensitive insulating layer 114. In addition, upper metal plate 240 can correspond with upper metal plate 116, via/trace 242 can correspond with via/trace 120, and via/trace 244 can correspond with via/trace 124. Further, pad 246 can correspond with pad 122, pad 248 can correspond with pad 126, and the connecting structures 252 can correspond with the connecting structures 130.

Figure 9:
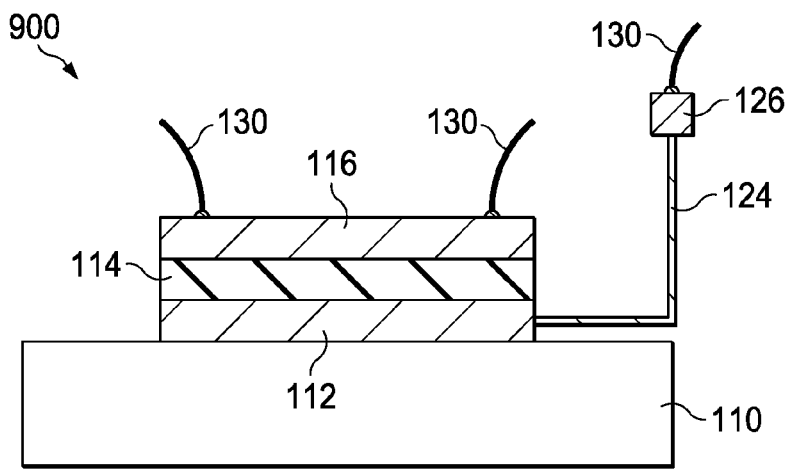
FIG. 9 is a cross-sectional view illustrating an example of a heated capacitor 900 in accordance with an alternate embodiment of the present invention.

FIG. 9 shows a cross-sectional view that illustrates an example of a heated capacitor 900 in accordance with an alternate embodiment the present invention. Heated capacitor 900 is similar to heated capacitor 100 and, as a result, utilizes the same reference numerals to designate the structures that are common to both capacitors.

As shown in FIG. 9, heated capacitor 900 differs from heated capacitor 100 in that lower metal plate 112 of heated capacitor 900 is electrically connected to a potential surge source, such as an antenna, and an internal circuit, such as an RF front end, while upper metal plate 116 is electrically connected to the two different external voltage sources.

In the present example, lower metal plate 112 is electrically connected to the potential surge source and the internal circuit by way of via/trace 124, pad 126, and a connecting structure 130. (Lower metal plate 112 can alternately be electrically connected to the potential surge source and the internal circuit by way of via/trace 120, pad 122, and a connecting structure 130.)

Upper metal plate 116, in turn, is electrically connected to a first external voltage source by way of a connecting structure 130 to receive a substantially constant voltage, such as 2V, and to a second external voltage source by way of a connecting structure 130 to receive a lower substantially constant voltage, such as ground.

Heated capacitor 900 operates the same as heated capacitor 100, differing only in which capacitor plate provides the heat and which capacitor plate is connected to the potential surge source and the internal circuit. In addition, heated capacitor 900 is formed in the same manner as heated capacitor 260, except that one tab, one via/trace, and one pad are no longer required. For example, the formations of the left-side tab 218, via/trace 242, and pad 246 can be omitted.

Figure 10A:
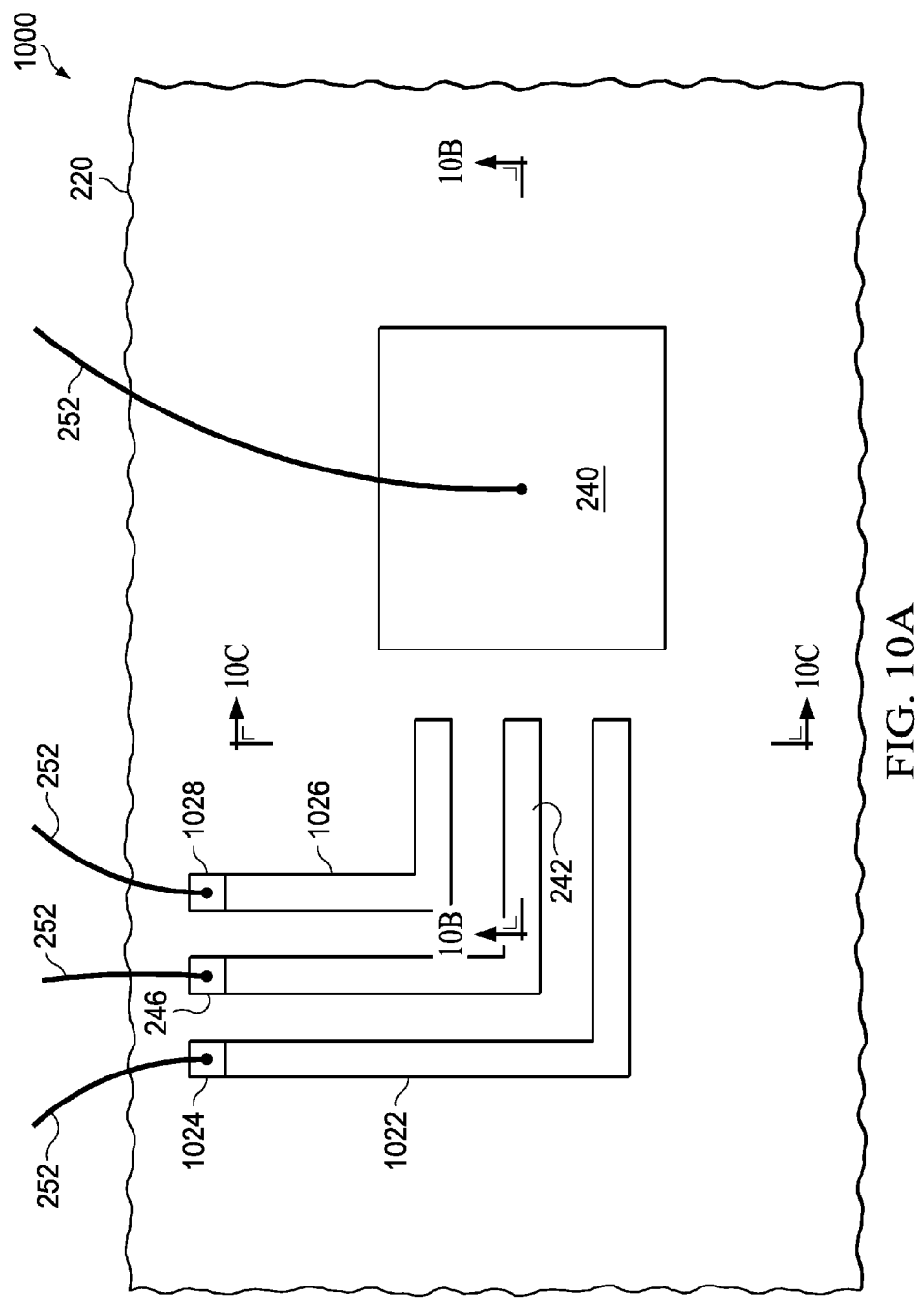
FIGS. 10A-10E are views illustrating an example of a heated capacitor 1000 in accordance with an alternate embodiment the present invention.
Figure 10C:
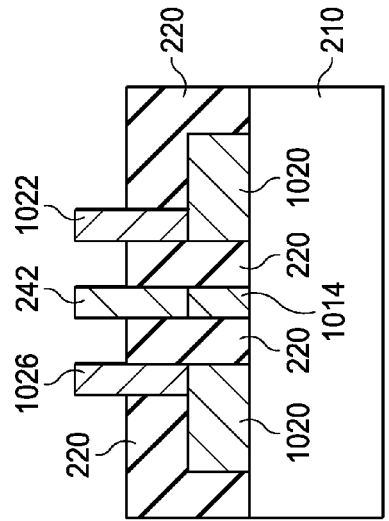
Figure 10B:
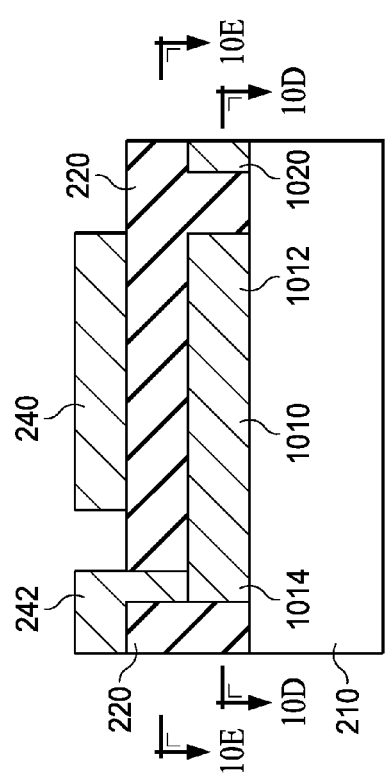
Figure 10E:
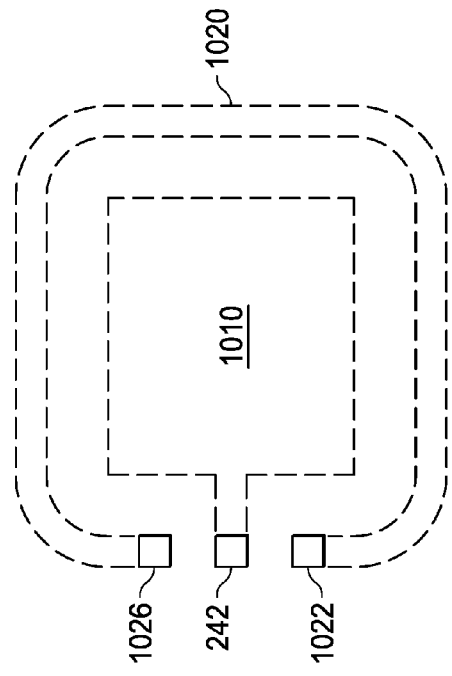
Figure 10D:
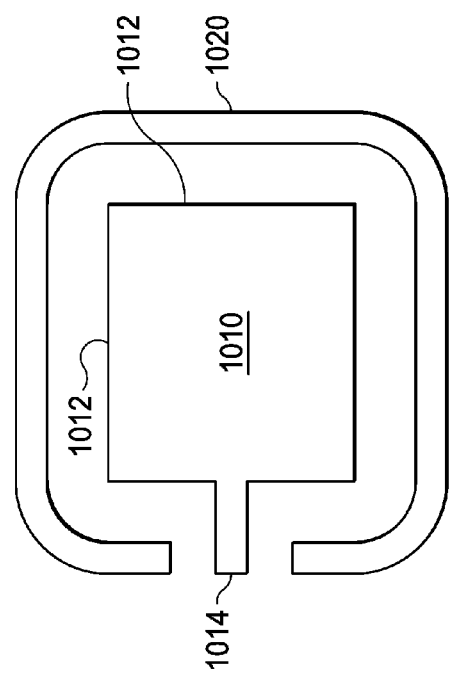

FIGS. 10A-10E show views that illustrate an example of a heated capacitor 1000 in accordance with an alternate embodiment the present invention. FIG. 10A shows a plan view. FIG. 10B shows a cross-sectional view taken along lines 10B-10B of FIG. 10A. FIG. 10C shows a cross-sectional view taken along lines 10C-10C of FIG. 10A. FIG. 10D shows a plan view taken along lines 10D-10D of FIG. 10B. FIG. 10E shows a plan view taken along lines 10E-10E of FIG. 10B.

Heated capacitor 1000 is similar to heated capacitor 260 and, as a result, utilizes the same reference numerals to designate the structures that are common to both capacitors. As shown in FIGS. 10A-10E, heated capacitor 1000 differs from heated capacitor 260 in that heated capacitor 1000 generates heat by running a current through a lower metal line that lies laterally adjacent to the lower metal plate.

In the present example, as shown in FIGS. 10B and 10D, heated capacitor 1000 differs from heated capacitor 260 in that heated capacitor 1000 utilizes a lower metal plate 1010 in lieu of lower metal plate 216. Lower metal plate 1010 has a sidewall 1012 that extends around the periphery of lower metal plate 1010.

As shown in FIGS. 10B, 10C, and 10D, lower metal plate 1010 is the same as lower metal plate 216, except that lower metal plate 1010 has only a single tab 1014 for making a via connection. Although lower metal plate 1010 is illustrated as a square/rectangular shape, other shapes, such as a circular shape, can alternately be used. In addition, whichever shape is utilized, the shape can have no tabs or multiple tabs.

As shown in FIGS. 10B, 10C, and 10D, heated capacitor 1000 also differs from heated capacitor 260 in that heated capacitor 1000 includes a lower metal trace 1020 that lies laterally adjacent to lower metal plate 1010. In one embodiment, no metal structure lies laterally between lower metal plate 1010 and lower metal trace 1020. In another embodiment, a metal structure can lie laterally between lower metal plate 1010 and lower metal trace 1020.

In the present example, lower metal trace 1020 partially surrounds lower metal plate 1010. As a result, lower metal trace 1020 lies adjacent to half of sidewall 1012 of lower metal plate 1010, as well as to three-quarters and more than three-quarters of sidewall 1012 of lower metal plate 1010.

As shown in FIGS. 10A, 10C, and 10E, heated capacitor 1000 additionally differs from heated capacitor 260 in that heated capacitor 1000 includes a via/trace 1022 that is attached to one end of lower metal trace 1020, and a pad 1024 that is attached to via/trace 1022. Heated capacitor 1000 also includes a via/trace 1026 that is attached to an opposite end of lower metal trace 1020, and a pad 1028 that is attached to via/trace 1026.

Further, in the present example, lower metal plate 1010 is electrically connected to an external voltage source to receive a substantially constant voltage, such as ground, by way of via/trace 242, pad 246, and a connecting structure 252. (Alternatively, lower metal plate 1010 can be electrically connected to the potential surge source and the internal circuit by way of via/trace 242, pad 246, and a connecting structure 252.)

Upper metal plate 240, in turn, is connected to the potential surge source and the internal circuit by way of a connecting structure 252. (Alternately, upper metal plate 240 can be connected to an external voltage source to carry a substantially constant voltage, such as ground, by way of a connecting structure 252.)

In operation, when a semiconductor chip that includes heated capacitor 1000 is powered up, the difference between the voltages on the pads 1024 and 1028 causes a current to flow from pad 1024 into, through, and out of lower metal trace 1020 to pad 1028. Lower metal trace 1020, in turn, is sized so that the resistance of lower metal trace 1020 to the current flow generates heat that removes moisture from moisture-sensitive insulating layer 220. In the event of an electrical surge, lower plate 1010, moisture-sensitive insulating layer 220, and upper plate 240, which form a capacitor, function in a conventional manner. Thus, unlike heated capacitors 100 and 260, no current flows through lower metal plate 1010.

Heated capacitor 1000 is formed in the same manner as heated capacitor 260. For example, lower metal plate 1010 can be formed at the same time and the same manner as lower metal plate 216, except that one tab can be omitted. In addition, lower metal trace 1020 can be formed at the same time and the same manner as lower metal plate 216 by modifying mold 214. Further, via/trace 1022, pad 1024, via/trace 1026, and pad 1028 can be formed at the same time and in the same manner as via/trace 242 and pad 246.

Figure 11A:
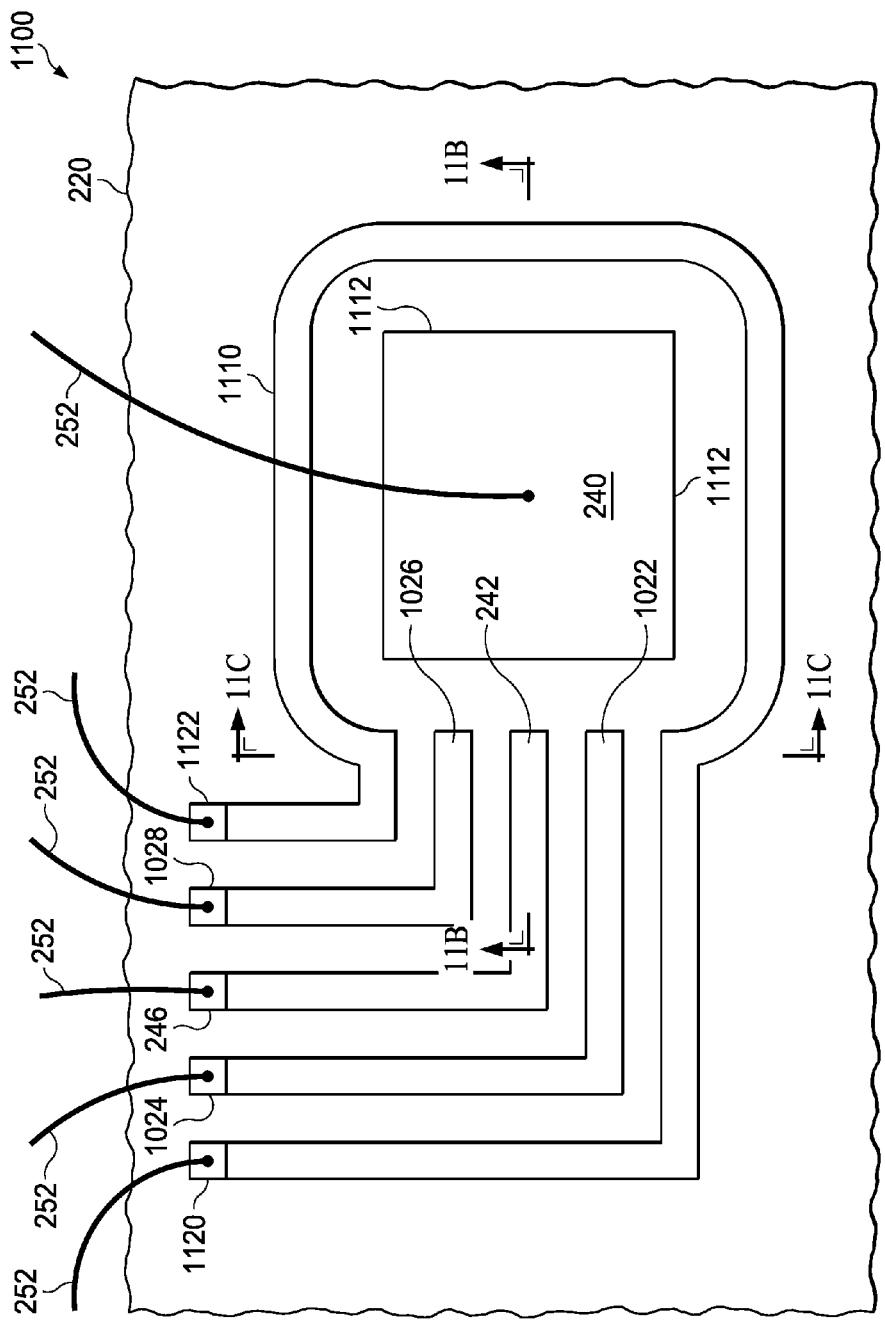
FIGS. 11A-11E are views illustrating an example of a heated capacitor 1100 in accordance with an alternate embodiment the present invention.
Figure 11C:
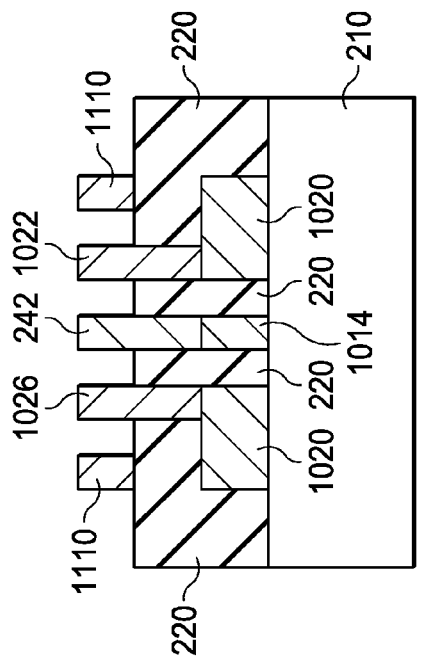
Figure 11B:
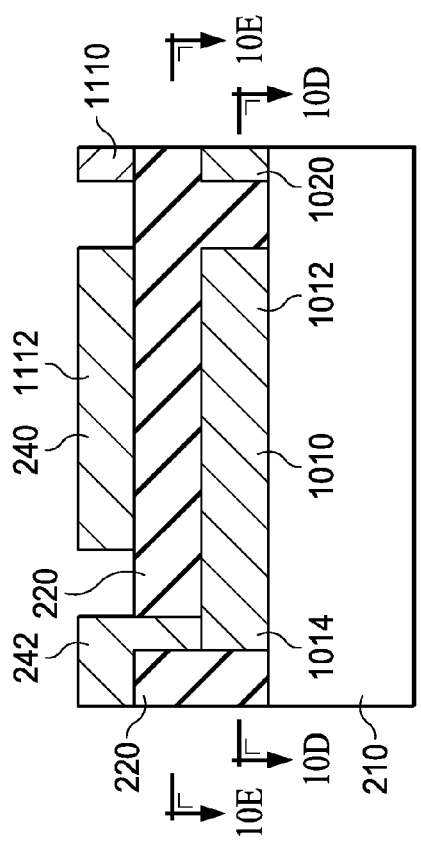
Figure 11E:
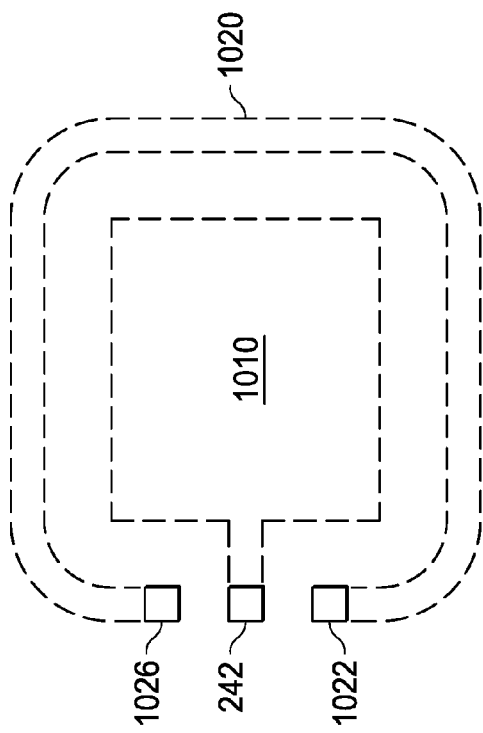
Figure 11D:
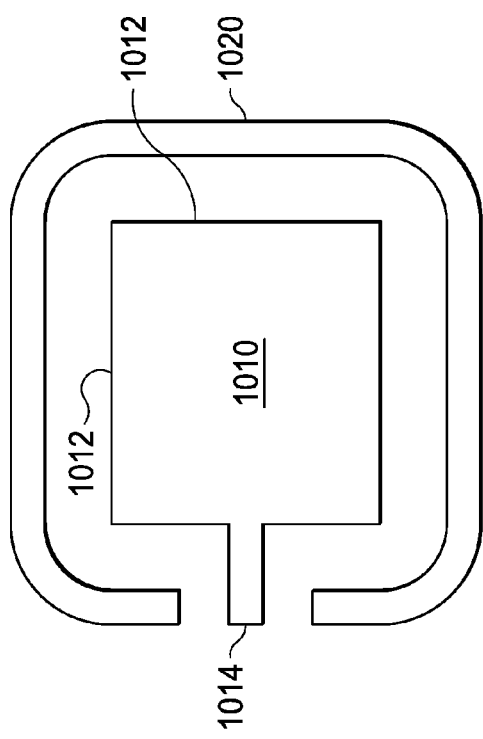

FIGS. 11A-11E show views that illustrate an example of a heated capacitor 1100 in accordance with an alternate embodiment the present invention. FIG. 11A shows a plan view. FIG. 11B shows a cross-sectional view taken along lines 11B-11B of FIG. 11A. FIG. 11C shows a cross-sectional view taken along lines 11C-11C of FIG. 11A. FIG. 11D shows a plan view taken along lines 11D-11D of FIG. 11B. FIG. 11E shows a plan view taken along lines 11E-11E of FIG. 11B.

Heated capacitor 1100 is similar to heated capacitor 1000 and, as a result, utilizes the same reference numerals to designate the structures that are common to both capacitors. As shown in FIGS. 11A-11E, heated capacitor 1100 differs from heated capacitor 1000 in that heated capacitor 1100 generates heat by running currents through both a lower metal line that lies laterally adjacent to lower metal plate 1010, and an upper metal line that lies laterally adjacent to upper metal plate 240.

As shown in FIGS. 11A, 11B, and 11C, heated capacitor 1100 differs from heated capacitor 1000 in that heated capacitor 1100 includes an upper metal trace 1110 that lies laterally adjacent to upper metal plate 240. In one embodiment, no metal structure lies laterally between upper metal plate 240 and upper metal trace 1110. In another embodiment, a metal structure can lie laterally between upper metal plate 240 and upper metal trace 1110.

Upper metal plate 240 has a sidewall 1112 that extends around the periphery of upper metal plate 240. In the present example, upper metal trace 1110 partially surrounds upper metal plate 240. As a result, upper metal trace 1110 lies adjacent to half of sidewall 1112 of upper metal plate 240, as well as three-quarters and more than three-quarters of sidewall 1112 of upper metal plate 1110.

As shown in FIGS. 11A, 11C, and 11E, heated capacitor 1100 has three via/traces 242, 1022, and 1026 that extend up from the lower level. As shown in FIGS. 11A and 11C, heated capacitor 1100 additionally differs from heated capacitor 1000 in that heated capacitor 1100 includes a pad 1120 that is attached to one end of upper metal trace 1110, and a pad 1122 that is attached to an opposite end of upper metal trace 1110.

The pads 1120 and 1122 are electrically connected to external voltage sources by way of the connecting structures 252. Pad 1120 is connected to receive a substantially constant voltage, such as 2V, while pad 1122 is connected to receive a lower substantially constant voltage, such as ground. Pads 1024 and 1120 can be connected to equal or different voltages. Similarly, pads 1028 and 1122 can be connected to equal or different voltages.

In operation, when a semiconductor chip that includes heated capacitor 1100 is powered up, the difference between the voltages on the pads 1024 and 1028 causes a current to flow from pad 1024 into, through, and out of lower metal trace 1020 to pad 1028. Lower metal trace 1020, in turn, is sized so that the resistance of lower metal trace 1020 to the current flow generates heat that removes moisture from moisture-sensitive insulating layer 220.

In addition, the difference between the voltages on the pads 1120 and 1122 causes a current to flow from pad 1120 into, through, and out of upper metal trace 1110 to pad 1122. Upper metal trace 1110, in turn, is sized so that the resistance of upper metal trace 1110 to the current flow generates heat that removes moisture from moisture-sensitive insulating layer 220. In the event of an electrical surge, lower plate 1010, moisture-sensitive insulating layer 220, and upper plate 240, which form a capacitor, function in a conventional manner.

Heated capacitor 1100 is formed in the same manner as heated capacitor 1000. For example, upper metal trace 1110, pad 1120, and pad 1122 can be formed at the same time and the same manner as upper metal plate 240, via/trace 242, pad 246, via/trace 1022, pad 1024, via/trace 1026, and pad 1028 by modifying mold 232.

Figure 12A:
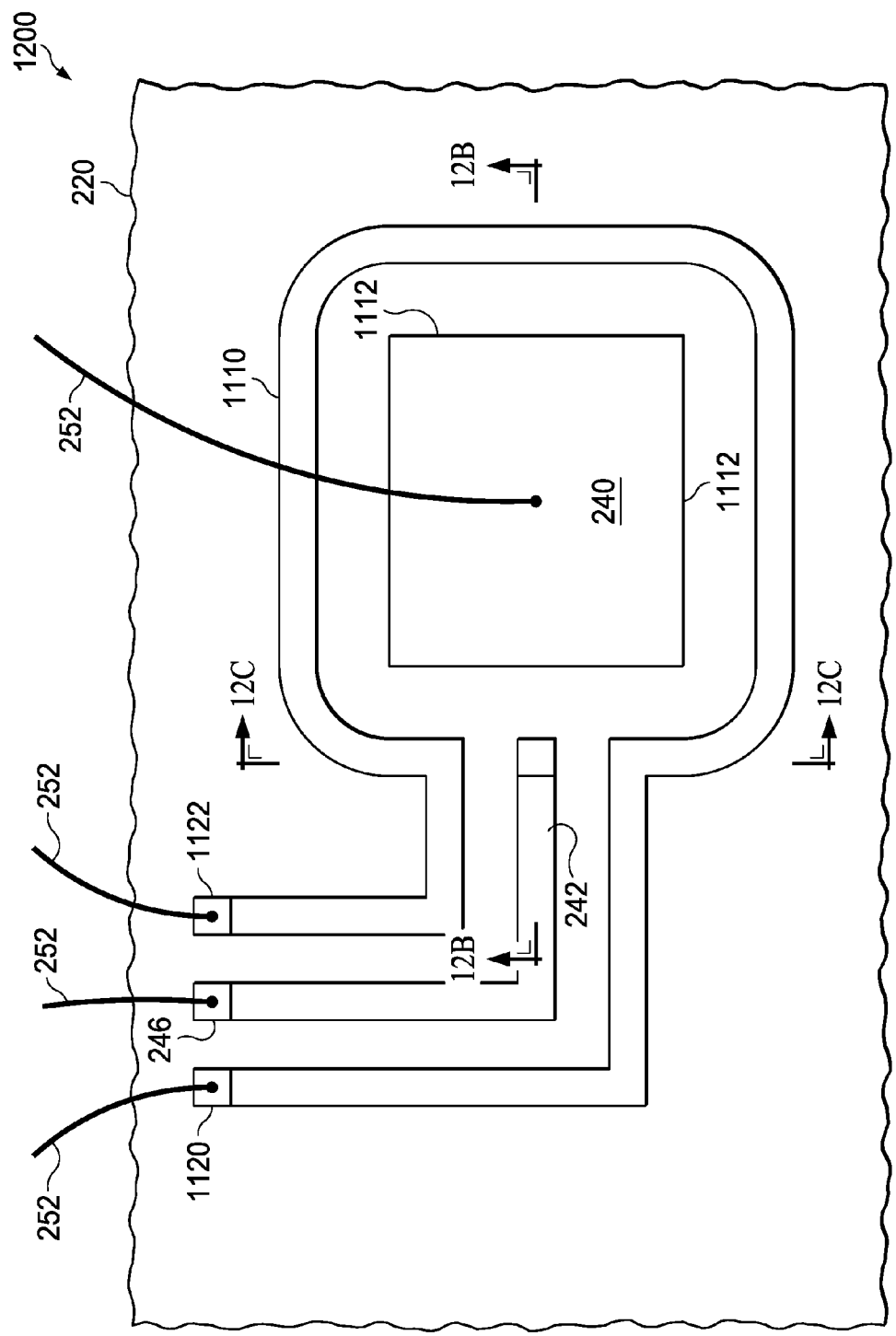
FIGS. 12A-12E are views illustrating an example of a heated capacitor 1200 in accordance with an alternate embodiment the present invention.
Figure 12C:
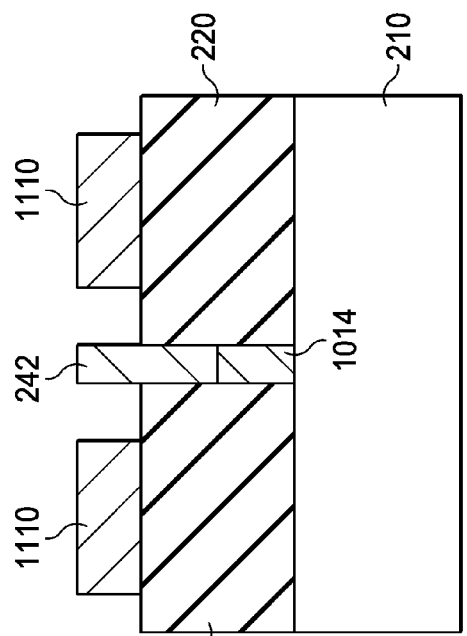
Figure 12B:
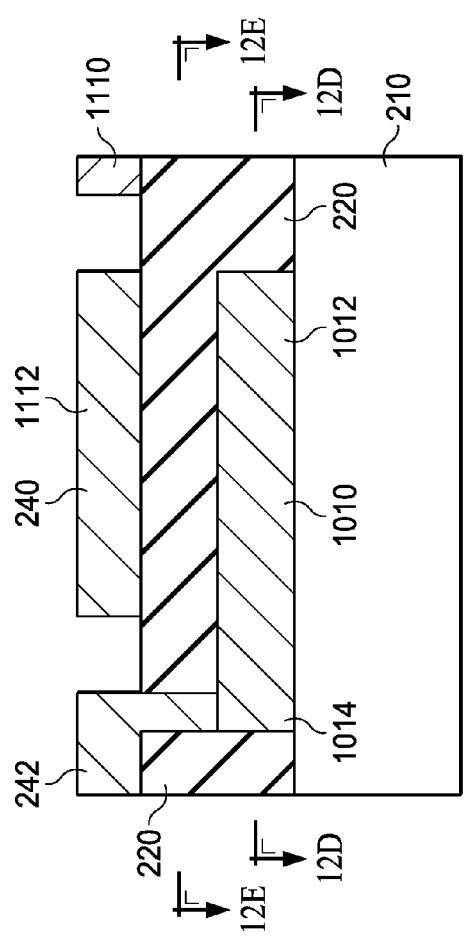
Figure 12E:
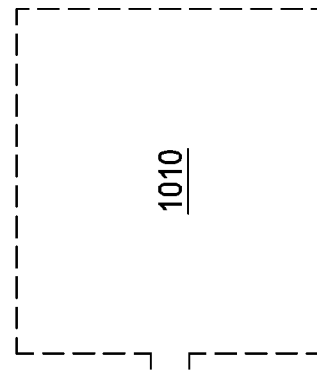
Figure 12D:
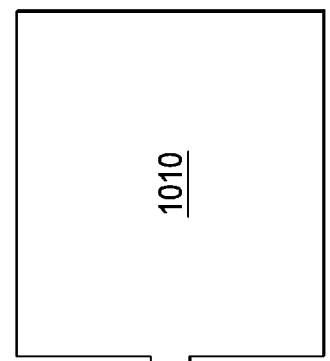

FIGS. 12A-12E show views that illustrate an example of a heated capacitor 1200 in accordance with an alternate embodiment the present invention. FIG. 12A shows a plan view. FIG. 12B shows a cross-sectional view taken along lines 12B-12B of FIG. 12A. FIG. 12C shows a cross-sectional view taken along lines 12C-12C of FIG. 12A. FIG. 12D shows a plan view taken along lines 12D-12D of FIG. 12B. FIG. 12E shows a plan view taken along lines 12E-12E of FIG. 12B.

Heated capacitor 1200 is similar to heated capacitor 1100 and, as a result, utilizes the same reference numerals to designate the structures that are common to both capacitors. As shown in FIGS. 12A-12E, heated capacitor 1200 differs from heated capacitor 1100 in that heated capacitor 1200 generates heat by running a current through only upper metal trace 1110. As a result, lower metal trace 1020, via/trace 1022, via/trace 1026, pad 1024, and pad 1028 are omitted.

In operation, when a semiconductor chip that includes heated capacitor 1200 is powered up, the difference between the voltages on the pads 1120 and 1122 causes a current to flow from pad 1120 into, through, and out of upper metal trace 1110 to pad 1122. Upper metal trace 1110, in turn, is sized so that the resistance of upper metal trace 1110 to the current flow generates heat that removes moisture from moisture-sensitive insulating layer 220.

In the event of an electrical surge, lower metal plate 1010, moisture-sensitive insulating layer 220, and upper metal plate 240, which form a capacitor, function in a conventional manner. Heated capacitor 1100 is formed in the same manner as heated capacitor 1100, except that the modifications required to form lower metal trace 1020, via/trace 1022, via/trace 1026, pad 1024, and pad 1028 are omitted.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A method of forming a heated capacitor comprising:
   forming a first metal structure on a substrate having a first lateral end and a second lateral end opposite the first lateral end;
   forming a non-conductive layer that touches the first metal structure;
   forming a second metal structure that touches the non-conductive layer, wherein the non-conductive layer isolates the first metal structure from the second metal structure and wherein the second metal structure forms a first capacitor plate of the heated capacitor; and
   connecting the first lateral end of the first metal structure to a first pad of the substrate to receive a first voltage and the second lateral end to a second pad of the substrate to receive a second voltage, the first voltage and the second voltage being different, the difference between the first voltage and the second voltage to cause a current to flow into, through, and out of the first metal structure, the current to generate heat from a resistance of the first metal structure, the heat to remove moisture from the non-conductive layer.

2. The method of claim 1 and further comprising forming a third metal structure when the first metal structure is formed, the non-conductive layer isolating the third metal structure from the first metal structure and the second metal structure, the second metal structure lying directly above the third metal structure, the first metal structure lying laterally adjacent to the third metal structure, wherein the third metal structure forms a second capacitor plate of the heated capacitor.

3. The method of claim 2 and further comprising:
   forming a fourth metal structure when the second metal structure is formed, the fourth metal structure lying laterally adjacent to the second metal structure, and touching the non-conductive layer, wherein the non-conductive layer isolates the fourth metal structure from the first, second, and third metal structures; and
   connecting the fourth metal structure to receive a third voltage and a fourth voltage, the third voltage and the fourth voltage being different, the difference between the third voltage and the fourth voltage to cause a current to flow into, through, and out of the fourth metal structure, the current flowing through the fourth metal structure to generate heat from a resistance of the fourth metal structure, the heat from the current flowing through the fourth metal structure to remove moisture from the non-conductive layer.

4. The method of claim 1, wherein the first metal structure does not extend directly under or over the third metal structure or the second metal structure.

5. A method of forming a heated capacitor comprising:
   forming a first metal structure on a substrate, wherein the first metal structure forms a first capacitor plate of the heated capacitor;
   forming a non-conductive layer that touches the first metal structure;
   forming a second metal structure that touches the non-conductive layer, wherein the second metal structure has a first lateral end and a second lateral end opposite the first lateral end and wherein the non-conductive layer isolates the first metal structure from the second metal structure; and
   connecting the first lateral end of the second metal structure to a first pad of the substrate to receive a first voltage and the second lateral end to a second pad of the substrate to receive a second voltage, the first voltage and the second voltage being different, the difference between the first voltage and the second voltage to cause a current to flow into, through, and out of the second metal structure, the current to generate heat from a resistance of the second metal structure, the heat to remove moisture from the non-conductive layer.

6. The method of claim 5 and further comprising forming a third metal structure when the second metal structure is formed, the third metal structure forming a second capacitor plate, lying laterally adjacent to the second metal structure, touching the non-conductive layer, and lying directly over the first metal structure, the non-conductive layer isolating the third metal structure from the first metal structure and the second metal structure.

7. The method of claim 5, wherein the second metal structure does not extend directly under or over the third metal structure or the first metal structure.

8. A method of forming a capacitor comprising:
   forming a first metal structure having a first lateral end and a second lateral end opposite the first lateral end;
   forming a non-conductive layer that touches the first metal structure;
   forming a second metal structure, the second metal structure touching the non-conductive layer;
   forming a third metal structure such that the second metal structure, the non-conductive layer, and the third metal structure form a capacitor, wherein the first metal structure and the third metal structure are formed directly on a same layer; and
   forming a first pad and a first connection extending from the first pad to the first lateral end of the first metal structure and forming a second pad and a second connection extending from the second pad to the second lateral end of the first metal structure.

9. The method of claim 8, wherein the first metal structure and the third metal structure are formed simultaneously such that the first metal structure is laterally spaced from at least three sides of the third metal structure by the non-conductive layer.

10. The method of claim 9 and further comprising:
    forming a fourth metal structure simultaneously with second metal structure, the fourth metal structure lying laterally adjacent to the second metal structure, and touching the non-conductive layer; and
    forming a third pad electrically connected to a fourth pad through the fourth metal structure.

11. The method of claim 8, wherein the third metal structure overlies the second metal structure.

12. The method of claim 8, wherein the second metal structure overlies the third metal structure.

13. The method of claim 8, wherein the first metal structure is located laterally outside of the capacitor and does not extend directly under or over the third metal structure or the second metal structure.

14. The method of claim 8, wherein the first, second, and third metal structures are isolated from each other by the non-conductive layer.

\* \* \* \* \*